United States Patent Office 3,496,239
Patented Feb. 17, 1970

3,496,239
PRODUCTION OF AROMATIC CONDENSATION PRODUCTS
Lyle A. Hamilton, Pitman, and Paul B. Venuto, Cherry Hill, N.J., assignors to Mobil Oil Corporation, a corporation of New York
No Drawing. Filed Mar. 5, 1965, Ser. No. 437,602
Int. Cl. C07c 37/00
U.S. Cl. 260—619      14 Claims

ABSTRACT OF THE DISCLOSURE

A process for producing aromatic condensation products which comprises effecting reaction of an aromatic compound, e.g., phenol, and a carbonyl compound, e.g., formaldehyde, in the presence of a catalyst comprising a crystalline alumino-silicate having an ordered internal structure at a temperature from about 120° C. to about 300° C.

---

This invention relates to the production of aromatic condensation products and in particular to a process for producing aromatic condensation products and/or derivatives thereof, by effecting reaction of aromatics and oxo- or carbonyl compounds in the presence of crystalline alumino-silicates that have unique catalytic activity.

The condensation of aromatic compounds such as phenols (mono- or poly-hydroxy benzenes), thiophenols, xylenes and the like with oxo- or carbonyl compounds, i.e. ketones and aldehydes, produces aromatic condensation products in which mono- and poly-substituted aryl groups are connected to alkylene radicals. At the same time, these aromatic condensation products often undergo subsequent reactions including rearrangement, degradation, polymerization and the like, which produce a variety of by-products, e.g. aromatic alcohols, alkyl phenols, alkenyl phenols, alkyl thiophenols, pyrans, phenolic resins and the like. In general, the catalysts commonly employed for these condensation reactions, such as sulfuric acid and hydrochloric acid, have not proved effective because their product selectivity is usually poor. Thus, the yield of condensation products is unpredictable and subject to appreciable variations from one run to another.

The present invention provides a process for producing aromatic condensation products by the condensation of aromatics with ketones or aldehydes in the presence of a crystalline alumino-silicate whereby relatively high yields of selected condensation products are effected with predictable product distribution.

In particular, this invention is directed to a process in which aromatics and ketones or aldehydes are reacted to produce aromatic condensation products in the presence of alumino-silicate catalysts having an ordered internal structure with a pore size of sufficient diameter to permit entry of the reactants and egress of the condensation products.

The aromatics that can be condensed with ketones or aldehydes by the present process include a variety of aromatic compounds, both mono- and poly-substituted alkyl benzenes, thio-phenols, hydroxy benzenes, the corresponding naphthalenes, and the like, and substituted derivatives thereof. Among the substituent groups that can be attached to the nucleus of the aromatic ring are alkyl, alkoxy, hydroxy, amino, halo, carboxy, mercapto and the like. It will be appreciated that the aromatic nucleus may have one or more substituent groups, but at least one nuclear hydrogen atom should be present in an ortho or para position to an activating group that is free of steric hinderances. In general, these compounds contain from 6 to 30 carbon atoms, and preferably contain from 6 to 10 carbon atoms. Representative of the specific aromatics that can be employed as reactants are phenol, o-cresol, m-cresol, o-chlorophenol, m-bromophenol, 2,4-dimethyl phenol, 2-ethyl phenol, 2,4-diethyl phenol, 2-isopropyl phenol, 2-isopropyl-4-methyl phenol, 2,4-diisopropyl phenol, 2-secbutyl phenol, mesitol, resorcinol, orcinol, 2-naphthol, o-xylene, p-xylene, m-xylene, thiophenol, thiocresol, dimethyl amino phenol, and the like.

The carbonyls suitable for the purpose of this invention may be saturated or unsaturated and include aliphatic alicyclic and cyclic compounds. For example, the ketones include acetone, methyl ethyl ketone, methyl propyl ketone, methyl isobutyl ketone, diethyl ketone, methyl vinyl ketone, methyl isopropenyl ketone, butyrone, acetophenone, benzophenone, cyclohexanone, 1,3-diphenyl-2-propanone, propiolophenone, and the like.

Among the suitable aldehydes are formaldehyde, acetaldehyde, butyraldehyde, acrolein, caproaldehyde, crotonaldehyde, cinnamaldehyde, p-tolualdehyde, o-tolualdehyde, benzaldehyde, salicyclaldehyde, and the like.

As exemplified above, the reactions of this invention will go with a wide range of aromatic nuclei and carbonyl compounds. In general the carbonyl compounds may contain from 1 to about 30 carbon atoms; with those containing from 1 to 15 being preferred. In addition, those carbonyl compounds with no alpha-hydrogen, (i.e., formaldehyde, benzaldehyde, hexafluoroacetone, and the like) give much more selective reactions to form desired condensation products.

The carbonyl compounds may be employed in organic solvents which are inert to the reactions of the present process. Water tends to deactivate the catalyst, lowering catalyst activity and shortening catalyst life, and should therefore be avoided or minimized.

Various amounts of aromatics and the carbonyl compounds may be employed as reactants for the purposes of this invention. In general, the amounts to be used are determined by the nature of the condensation products to be produced. For example, if bis-phenolic products are desired, i.e., 2,2-bis(4-hydroxy phenol)propane [also known as 2,2-(4,4'-dihydroxy-diphenyl)propane], the molar ratio between the phenol and the carbonyl should be at least about 2:1. Preferably, the ratio is from about 5:1 to about 8:1. Generally, the reactions should be run so that the aromatic compound is in great excess and so that the carbonyl compound is used up as it is added to a mixture of the catalyst and the aromatic.

The condensation of phenols with aldehydes or ketones, in accordance with this invention, can be illustrated by the following reactions:

EQUATION I

Reaction of phenol with acetone

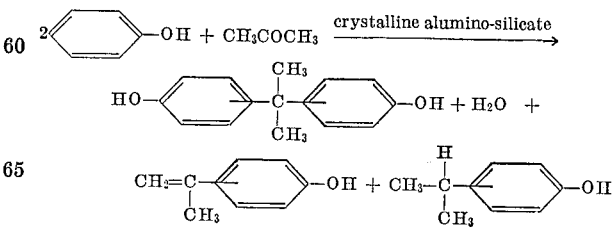

EQUATION II

Reaction of phenol with formaldehyde

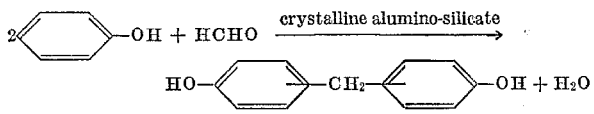

EQUATION III

Reaction of benzaldehyde with phenol

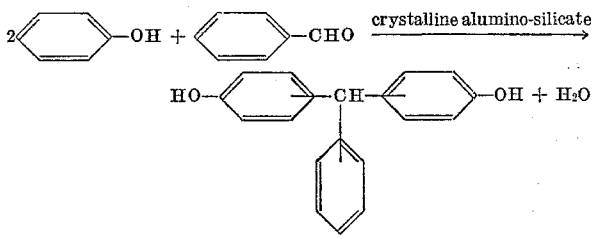

EQUATION IV

Reaction of formaldehyde with thiophenol

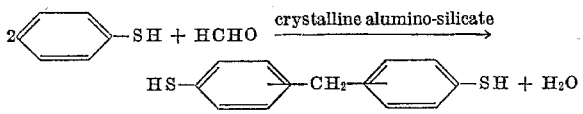

EQUATION V

Reaction of formaldehyde with m-xylene

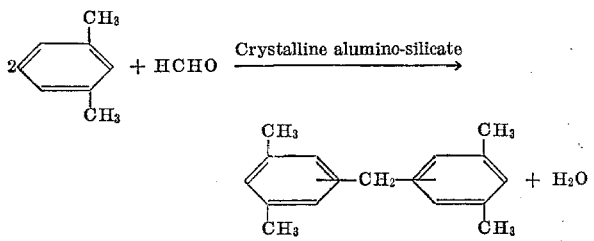

EQUATION VI

Reaction of phenol with hexafluoroacetone

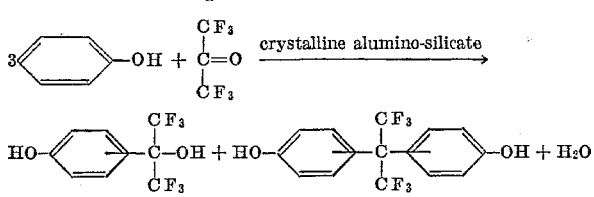

Exemplary of some of the bisaryl condensation products that can be produced by this process are 4,4′-dihydroxy-triphenyl-methane;
4,4′-dihydroxy-3,3′,5,5′-tetramethyl-diphenyl-methane;
2,2-(4,4′-dihydroxy-diphenyl)propane;
2,2-(4,4′-dihydroxy-3,3′-dimethyl-diphenyl)-propane;
2,2-(4,4′-dihydroxy-diphenyl)-pentane;
2,2-(4,4′-dihydroxy-diphenyl)-4-methyl-pentane;
3,3-(4,4′-dihydroxy-diphenyl)-pentane;
1,1-(4,4′-dihydroxy-diphenyl)-cyclohexane;
2,2-(4,4′-dihydroxy-diphenyl)-2-phenyl-ethane;
(4,4′-dihydroxy-diphenyl)-diphenyl-methane(4,4′-dimercapto-diphenyl)-methane;
3,3′,5,5′-tetramethyl-diphenylmethane;
2,2′(4,4′-dihydroxy-diphenyl)hexafluoropropane and the like.

Other products such as isopropyl and isopropenyl phenol formed in Equation I are believed to result from dispropotrionation of the mono-phenolic and bisphenolic condensation products. In other like condensation reactions it has been found that under certain conditions, alkyl phenols, aromatic alcohols, and the like can be produced by the present process. In some cases carbinol compounds can be isolated, or made the main product as illustrated in Equation VI. Thus, it will be apparent that the products of this invention may contain from 6 to about 40 carbon atoms per molecule.

The temperature at which the reaction between aromatics and ketones or aldehydes is conducted can vary over a wide range from as low as about 120° C. to about 300° C.; the preferred range being from about 150° to 250° C.

The preparation of aromatic condensation products in accordance with the present invention, can be conducted from about atmospheric to superatmospheric pressures. In this manner the process can be effected in the gas and liquid phase. It is preferred to conduct the reactions of this invention at pressures such that all reactants are in the liquid phase. In the liquid phase, it is preferable to slowly add the carbonyl compound to the liquid mixture of aromatic compound and catalyst in a stirred batch reactor. This procedure prevents self-condensation of the carbonyl and coke formation. Also operation in the liquid phase with a high molar ratio of aromatic to carbonyl compound prevents polyformylation.

The amount of aluminosilicate catalyst used will vary, and depend in part, on whether the process used is a batch type operation, a continuous operation or a semi-continuous operation. Generally, with a batch type operation, the amount of catalyst will vary from about 5 percent by weight to about 20 percent by weight, based on the weight and the aromatic charged.

It is to be understood that the aluminosilicate catalysts can be regenerated by burning off their contaminants at a temperature of about 500° C.

Because several of the condensation products produced by this process may be solids or viscous melts at the required operating temperatures, it is generally preferred to employ an organic solvent reaction medium. Preferred solvents are benzene and chlorobenzenes. Other solvents should be checked for stability over our active catalysts before being used.

As previously stated, the condensation of aromatic compounds with ketones or aldehydes, in accordance with this invention, is conducted utilizing as a catalyt an aluminosilicate having an ordered internal structure which can be either naturally occurring or synthetically produced. These catalysts contain active sites that are formed by the presence of certain exchangeable metal cations and/or hydrogen ions ionically bonded or chemisorbed within the ordered internal structure of the aluminosilicate; preferably the cations are those which form a high concentration of hydrogen sites within the aluminosilicate.

It will be appreciated that the exchangeable cations and/or ions may be present within the catalyst by base exchanging them with either a naturally occurring or a synthetic aluminosilicate, by incorporation the cations and/or ions during the formation of a synthetic aluminosilicate, or by being an integral portion of a naturally occurring alumino-silicate. In general, the unique activity of the alumino-silicate catalyst for effecting condensation of phenols with ketones or aldehydes depends on the nature and concentration of its active sites as well as the availability of the sites for contact with the reactants.

In accordance with the present invention, several different types of alumino-silicates can be employed as catalysts. Particularly effective catalysts are the aluminosilicates that contain a high concentration of hydrogen sites within an ordered internal structure. These hydrogen sites are produced by ionically bonding of chemisorbing certain metal cations and/or hydrogen ions within the molecular structure of the alumino-sicilate. Such bonding or chemisorption can be effected by base exchange of the alumino-silicate with a fluid medium containing the metal cations and/or hydrogen ions, the resulting exchanged product often thus acquiring an acid character.

Alumino-silicate catalysts having a high concentration of hydrogen sites can be prepared from a variety of naturally occurring and synthetic alumino-silicates. These alumino-silicates have exchangeable metal cations, e.g., alkali metals and alkaline earth metals) that can be completely or partially replaced by conventional base exchange with certain other metal cations and/or hydrogen ions.

Some alumino-silicates can be base exchanged directly with hydrogen ions, as indicated in the preceding paragraph, to form products which have an acid character and which are suitable for use as catalysts. Other alumino-silicates such as zeolite X, a synthetic faujasite, are either not suitable for direct base exchange with hydrogen ions, or are not structurally or thermally stable after a portion of their exchangeable metal cations have been replaced with hydrogen ions. Thus, it is often necessary to exchange other metal cations with the alumino-silicates in order to achieve the necessary stability within the ordered internal structure prior to the inclusion of the hydrogen ions.

Furthermore, the stability and the distribution of active cation sites formed within an alumino-silicate is also affected by the silicon to aluminum atomic ratio within its ordered internal structure. In an isomorphic series of crystalline alumino-silicates, the substitution of silicon for aluminum in the rigid framework of the lattice results in a decrease of total cation sites as evidenced by reduction of exchange capacity ad proved by elemental analysis. Thus, among the faujasite isomorphs, the zeolite known as "Y" will have sparser distribuition of sites within its pores than the zeolite known as "X."

It has been found that alumino-silicates having a high silicon to aluminum atom ratio are particularly desirable as catalysts, for purposes of this invention. As a rule, the ratio of silicon to aluminum atoms is at least about 1.8 to 1, in this preferred type catalyst. These catalysts are readily contacted with solutions which contain hydrogen ions and are readily regenerated, after having been used, by contact at elevated temperatures with an oxygen containing stream under controlled conditions such that carbonaceous residues can be efficiently removed without damage of the essential structure and properties of catalyst.

It will also be appreciated that the concentration of the hydrogen sites, may vary according to the cations and/or ions employed, the degree of base exchange, as well as the alumino-silicate being treated. Accordingly, it has been determined that the alumino-silicates having at least 0.5 milliequivalent of hydrogen per gram of solid and preferably above about 0.75 milliequivalent of hydrogen per gram of solid are effective catalysts for purposes of this invention. It will be understood that this value indicates the total concentration of hydrogen ions present within an alumino-silicate and that the spatial concentration of these ions is dependent on the ordered internal structure of the specific alumino-silicate being treated.

Because the unique activity of the alumino-silicate catalyst for effecting the reactions of the present invention is dependent on the availability of active cation sites therein, as well as the nature of these sites, the defined pore size of the alumino-silicate is to be considered during the preparation. In general, the alumino-silicate should have a pore size of such dimensions that it can accept the reactants of this invention within its ordered internal structure and allow egress to the product. Thus, the pore size is from at least about 6 A., and preferably about 6 A. to about 15 A. in diameter. It will be appreciated that the selection of the alumino-silicate catalyst, to be used in a specific application, will depend upon the reaction temperature and pressure as well as the other operating conditions.

It will be appreciated also that in some instances those alumino-silicates having a relatively sparse distribution of hydrogen sites can also be employed as catalysts. Thus, the alkali metal (e.g., sodium, lithium, and the like) and alkaline earth metal (e.g., calcium, and the like) forms of the synthetic and naturally occurring alumino-silicates, including zeolite "A" and the faujosites, such as zeolites "X" and "Y" may serve as catalysts. (These zeolites are hereinafter described in greater detail.)

Typical of the alumino-silicates employed in accordance with this invention, are several alumino-silicates, both natural and synthetic, which have a defined pore size of at least about 6 A. and preferably about 6 A. to about 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

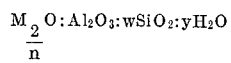

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-silicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujosite designated as zeolite X, and is represented in terms of mole ratios of oxides as follows:

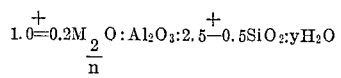

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9\ Na_2O:Al_2O_3:2.5\ SiO_2:6.1\ H_2O$$

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujosite, having the same crystalline structure as zeolite X and designated as zeolite Y has been found to be active. Zeolite Y differs from zeolite X in that it contains more silica and less alumina.

Zeolite Y is represented in terms of mole ratios of oxides as follows:

$$0.9\pm0.2\ Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Other alumino-silicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a mixed salt of sodium, calcium and/or potassium. The pure sodium form may be represented by the following formula:

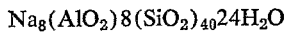

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g. acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ionically bonding additional metals and/or hydrogen ions within its pore structure so that its catalytc activty may be altered for a partcular reaction. Among the naturally occurring crystalline alumino- silicates which can be employed are faujasite, heulandite, clinoptilolite, chabazite, gmelinite, mordenite and mordenite-like structures, and dachiardite.

An effective alumino-silicate catalyst is prepared from the sodium form of zeolite X having a pore size of 13 A., which is a commercially available zeolite designated as Linde "13X," by conventional base exchanging involving partial or complete replacement of the sodium of zeolite X by contact with a fluid medium containing cations of the rare earth metals. Any medium which will effect ionization without affecting the crystalline structure of the zeolite can be employed. After such treatment, the resulting exchanged zeolite product is water washed, dried and dehydrated. The dehydration thereby produces the characteristic system of open pores, passages, or cavities of the crystalline alumino-silicates.

As a result of the above treatment, the rare earth exchanged alumino-silicate is an activated crystalline catalyst material in which the molecular structure has been changed by having rare earth cations and hydrogen ions chemisorbed or ionically bonded thereto.

It will be appreciated that the defined pore size of iron of rare earth metal exchanged zeolite X may vary from above 6 A., generally from 6 A. to 15A., and preferably in the approximate range of 10 A. to 13 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_2$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight, samarium, 5–6% by weight; gadolinium, 3–4% by weight; yttrium, 0.4% by weight; other rare earths 1–2% by weight. It is to be understood that other mixtures of rare earths are equally applicable in the instant invention.

Another active catalyst can be produced from zeolite X by base exchange of both rare earth cations and hydrogen ions to replace the sodium cations from the aluminosilicate. This base exchange can be accomplished by treatment with a fluid medium containing the rare earth salts followed by another containing hydrogen ions or cations capable of conversion to hydrogen ions. Inorganic and organic acids represent the source of hydrogen ions, whereas ammonium compounds are representative of the compounds containing cations capable of conversion to hydrogen ions. It will be appreciated that this fluid medium can contain a hydrogn ion, an ammonium cation, or mixture thereof, and have a pH from about 1 to about 12.

Other effective catalysts can be prepared from aluminosilicates such as zeolite Y and mordenite. Exchange of rare earth metals, or the like for the sodium cations within zeolite Y produces a highly active catalyst in a manner similar to that described for preparation of the rare earth exchanged zeolite X. In addition, because of its high acid stability, zeolite Y may be treated to produce a particularly effective catalyst by partially replacing the sodium ions with hydrogen ions. This replacement can be accomplished by treatment with a fluid medium containing a hydrogen ion or an ion capable of conversion to a hydrogen ion (i.e., inorganic acids or ammonium compounds or mixture thereof).

Mordenite can be activated to serve as a catalyst for the instant invention by replacement of the sodium ion with a hydrogen ion. The necessary treatment is essentially the same as that described above for the preparation of acid zeolite Y except that a mineral acid such as HCl is used as a source of hydrogen ion. In general, the mordenite is reduced to a fine powder (approximately passing a 200 mesh sieve and preferably passing 300 and 325 mesh sieves or finer) and then acid treated.

It will be appreciated that cations of metals other than the rare earths employed to replace the exchangeable cations from the alumino-silicates to provide effective catalysts for this invention. Exemplary of these metals are zinc, iron, magnesium, tin, cobolt, copper, nickel, silver, and the like. Moreover, higher valence metals such as zirconium, titanium, vanadium, chromium, manganese, tungsten, osium, and the like can also be employed. It will be understood that the chemical properties of the metal, i.e., its atomic radius, degree of ionization, hydrolysis constant, and the like, often determine its suitability for exchange with a particular alumino-silicate material. It will also be appreciated that certain divalent metals such as calcium, barium, magnesium, and the like can be used with ammonium chloride or like ammonium compounds to produce active cation sites within the alumino-silicate catalyst by conventional base exchange techniques, the ammonium ion being decomposed to form hydrogen sites by heating the exchanged alumino-silicate to drive off ammonia.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline aluminosilicate. Such materals include by way of examples, dried inorganic oxide gels and gelatinous precipitates of alumina, silica, zirconia, magnesia, thoria, titania, boria, and combinations of these oxides with one another and with other components. Other sutable supports nclude actvated charcoal, mullite, kieselguhr, bauxite, silicon carbide, sintered alumina and various clays. These supported crystalline alumino-silicates may be prepared by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle of other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, III–B, and IV–A of the Periodic Table. Such components include for example, silica-alumina, silica-magnesia, silica-alumina-silica thoria, silica-beryllia, silica-titania as well as ternary combinations such a silica alumina-thoria, silica-alumina-zirvonia, silica-alumina-magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of about $\frac{1}{16}''$ to about $\frac{1}{8}''$ in diameter, obtained upon pelleting the alumino-silicate with a suitable binder such as clay. The zeolite X, described hereinabove, may be obtained on a clay-free basis or in the form of pellets in which clay is present as a binder.

It will be appreciated that the products formed by the present invention will be dependent upon such conditions as temperature, pressure, space velocity and molar ratio of the reactants, and the like. Thus, the manner in which these conditions affect the process of this invention may be more readily understood by reference to the following examples.

EXAMPLE I

In a series of five runs, phenol was condensed with formaldehyde using various alumino-silicate catalysts in a glass reactor equipped with a stirrer. Sixty-four grams of phenol and from 3 to 5 grams of the finely powdered alumino-silicate catalyst were heated with stirring to the reaction temperature (i.e. about 182° C.). A solution containing 6.6 grams of trioxane, the crystalline trimer of formaldehyde, in 100 cc. of benzene solvent was introduced through a long stainless steel needle inserted well below the surface of the reaction mixture. The trioxane solution was metered into the needle by a motor-driven syringe pump over a period of about 1.75 hours.

As shown in Table 1, the conversion of phenol to a mixture of three isomeric $C_{13}H_{12}O_2$ bisphenols was significant in all the runs, with particularly good conversions being obtained with the more acid type catalysts.

The products were separated by fractional crystallization, elution chromatography, and gas chromotography and identified by mass, infrared, and nuclear magnetic resonance spectroscopy.

TABLE 1.—RELATIVE ACTIVITY OF ALUMINO-SILICATE FOR CONDENSATION OF PHENOL AND FORMALDEHYDE [1]

| Run | Catalyst [2] | Percent Conversion [3] | $C_{13}H_{12}O_2$ isomer percent dist. | | |
|---|---|---|---|---|---|
| | | | o,o'– | o,p'– | p,p'– |
| 1 | Hydrogen exchanged zeolite Y. | 79.9 | 31.4 | 44.5 | 24.1 |
| 2 | Rare earth exchanged zeolite Y. | 22.3 | 28.4 | 46.6 | 25.0 |
| 3 | Hydrogen exchanged mordenite. | 9.3 | 23.1 | 47.7 | 29.2 |
| 4 | Rare earth exchanged zeolite X. | 7.3 | 40.5 | 39.3 | 20.2 |
| 5 | Calcium exchanged zeolite X. | 2.6 | 44.8 | 39.5 | 15.7 |

[1] Final $C_6H_5OH/HCHO$ molar ratio was 5.82.
[2] Reactant/catalyst wt. ratio 15.8, reaction temperature 182° C. stirring time 1.75 hr.; All catalysts calcined at from 400 to 600° C. prior to use.
[3] Of phenol to $C_{13}H_{12}O_2$.

EXAMPLE II

Following the general procedure described for Example I, additional runs were conducted using different aromatics and carbonyl compounds with either zeolite Y catalyst or a rare earth exchanged zeolite X catalyst, to produce aromatic condensation products.

As shown in Table 2, the major condensation products were bisarylalkanes with the exception of run 10. In this run a tertiary alcohol 2-(hydroxy-phenyl), 2-hydroxyhexafluoropropane was the significant product.

TABLE 2.—REACTIONS OF AROMATICS WITH CARBONYL COMPOUNDS OVER HYDROGEN ZEOLITE Y CATALYST [1]

| Run | Aromatic | Carbonyl Compound | Aromatic-carbonyl molar ratio | Total reactant catalyst wt. ratio | Stir time, hours | Major condensation product | Percent Conv.[2] |
|---|---|---|---|---|---|---|---|
| 6 | Phenol | $C_6H_5CHO$ | 1.00 | 18.2 | 2.5 | $(C_6H_4OH)_2CHC_6H_5$ | 7.4 |
| 7 | do | $CH_3COCH_3$ | ([3]) | [4] 6.0 | 5.7 | $(C_6H_4OH)_2C(CH_3)_2$ | 6.0 |
| 8 | m-Xylene | HCHO | 5.93 | 11.5 | 2.0 | $(CH_3C_6H_3CH_3)_2CH_2$ | 69.5 |
| 9 | Thiophenol | HCHO | 5.85 | 12.1 | 2.0 | $(C_6H_4SH)_2CH_2$ | 33.0 |
| 10 | Phenol | $CF_3COCF_3$ | ([3]) | [4] 15.0 | 16.5 | $(C_6H_5OH) C(CF_3)_2OH$ | 50.0 |
| 11 | do | $CH_3COCH_3$ | ([3]) | [4] 6.0 | 5.7 | $(C_6H_4OH)_2C(CH_3)_2$ | 1.0 |

[1] Reaction temperature of 182° C.
[2] Of aromatic reactant to major condensation product.
[3] Undetermined; gaseous ketone bubbled through refluxing phenol-catalyst mixture.
[4] Based on wt. of phenol only.

EXAMPLE III

In this example a run was conducted with a catalyst of hyrogen exchanged zeolite Y using a stainless steel reactor in a pressurized continuous flow system. Fifteen grams of the catalyst were charged to the reactor. Then a solution containing six hundred grams of phenol and thirty-three grams of trioxane in 500 cc. of benzene was pumped over the catalyst at such a rate (100 cc. per hour) that the liquid hourly space velocity was 2.4. The temperature of the reaction was 200° C. and the pressure, 400 p.s.i.a. During the 5.75-hour run, a maximum of 4% conversion of phenol of $C(_{13}H_{12}O_2$ bisphenols was obtained.

From the above examples it is apparent that the process of this invention selectively produces certain aromatic condensation products with predictable product distribution.

Thus, inspection of the above data shows that the invention provides a process for producing many different aromatic condensation products and it will be readily appreciated that many variations and modifications can be made in the process without departing from the spirit of the invention as set forth in the appended claims.

What is claim is:

1. A process for producing hydroxy substituted aromatic condensation products which comprises reacting an aromatic compound containing to 6 to 10 carbon atoms and having 1 to 3 hydroxy groups and at least one hydrogen atom present in an ortho or para position to a hydroxy group that is free of steric hindrances, the remaining substituent groups being selected from the class consisting of lower alkyl, halo, and amino groups, with a carbonyl compound containing from 1 to 15 carbon atoms and being selected from the group consisting of unsubstituted aliphatic and aromatic ketones and aldehydes and halogen substituted aliphatic ketones, at a temperature from about 120° C. to about 300° C. in the presence of a catalyst comprising a crystalline alumino-silicate containing active cation sites within an ordered internal structure having a pore size of from about 6A. to about 15A. in diameter, said cation sites being produced by cations selected from the group consisting of rare earth metals, calcium, hydrogen and mixtures thereof.

2. The process of claim 1 in which the aromatic compound is phenol, the carbonyl compound is selected from the group consisting of formaldehyde, trioxane, acetone and benzaldehyde and the aromatic condensation products are bisphenols.

3. The process of claim 1 in which the aromatic compound is phenol, the carbonyl compound is hexafluoroacetone and the aromatic condensation products comprise 2-hydroxy-phenyl), 2-hydroxy hexafluoropropane.

4. The process of claim 1 in which the aluminosilicate has a silicon to aluminum ratio of at least 1.8 within an ordered internal structure.

5. The process of claim 1 in which the aluminosilicate catalyst is a rare earth exchanged faujasite.

6. The process of claim 1 in which the aluminosilicate catalyst is a hydrogen exchanged faujasite.

7. The process of claim 1 in which the alumino-silicate catalyst is hydrogen exchanged zeolite Y.

8. The process of claim 1 in which the aluminosilicate catalyst is hydrogen exchanged mordenite.

9. The process of claim 1 in which the alumino-silicate is contained in and distributed throughout a matrix binder.

10. The process of claim 1 in which the reaction is effected from about atmospheric to superatmospheric pressures.

11. The process of claim 1 in which the reaction is effected within an organic solvent medium.

12. The process of claim 1 in which the reaction is effected in a liquid phase.

13. The process of claim 1 in which the carbonyl compound has no alpha-hydrogen atoms.

14. The process of claim 1 in which the molar ratio between the aromatic compound and the carbonyl compound is at least about 5 to 1.

References Cited

UNITED STATES PATENTS 2,572,141 10/1951 Harris.
3,140,253 7/1964 Plank et al.

BERNARD HELFIN, Primary Examiner

N. P. MORGENSTERN, Assistant Examiner

U.S. Cl. X.R.

252—455; 260—571, 570, 649, 609

UNITED STATES PATENT OFFICE
CERTIFICATE OF CORRECTION

Patent No. 3,496,239  Dated February 17, 1970

Inventor(s) L. A. HAMILTON and P. B. VENUTO

It is certified that error appears in the above-identified patent and that said Letters Patent are hereby corrected as shown below:

Col. 4, Line 1 - "disproportrionation" should be --disproportionation--

Col. 5, Line 8 - "e.g. alkali...metals)" should be --(e.g. alkali...metals)--

Col. 5, Line 22 - "the" should be --these--

Col. 5, Line 33 - "capacity ad" should be --capacity and--

Col. 7, Line 37 - "catalytc" should be --catalytic--

Col. 7, Line 62 - "of" should be --or--

Col. 8, Line 3 - "(as $Nd_2O_2$)" should be --(as $Nd_2O_3$)--

Col. 8, Line 57 - "Moreover, higher" should be --Moreover, other higher--

Col. 9, Line 14 - "sutable" should be --suitable--

Col. 9, Line 14 - "nclude" should be --include--

Col. 9, Line 15 - "actvated" should be --activated--

Col. 9, Line 67 - "salt of metal" should be --salt of a metal--

Col. 11, Line 30 - "phenol of" should be --phenol to--

Col. 11, Line 42 - "what is Claim is" should be --What is Claimed is--

UNITED STATES PATENT OFFICE
CERTIFICATE OF CORRECTION

Patent No. 3,496,239    Dated February 17, 1970

Inventor(s) L. A. HAMILTON and P. B. VENUTO

It is certified that error appears in the above-identified patent and that said Letters Patent are hereby corrected as shown below:

Col. 12, Line 23 - "2-hydroxy-phenyl)" should be --2-(hydroxy-phenyl)--

Signed and sealed this 10th day of November 1970.

(SEAL)
Attest:

EDWARD M. FLETCHER, JR.
Attesting Officer

WILLIAM E. SCHUYLER, JR.
Commissioner of Patents